United States Patent [19]
Davies et al.

[11] Patent Number: 5,944,132
[45] Date of Patent: Aug. 31, 1999

[54] METHOD AND APPARATUS FOR CONTROLLING ROBOTIC GOLF CADDY APPARATUS

[75] Inventors: Ronald C. Davies, San Jose; Frederick J. Fowler, Fremont, both of Calif.

[73] Assignee: Golfpro International, Inc., Santa Clara, Calif.

[21] Appl. No.: 08/925,530

[22] Filed: Sep. 8, 1997

Related U.S. Application Data

[63] Continuation-in-part of application No. 08/682,105, Jul. 17, 1996, Pat. No. 5,711,388

[60] Provisional application No. 60/001,258, Jul. 20, 1995.

[51] Int. Cl.[6] .................................................. B62D 1/28
[52] U.S. Cl. .............................. 180/168; 280/DIG. 5; 180/65.1; 701/215; 901/1
[58] Field of Search ................................ 180/167, 168, 180/65.1; 280/DIG. 5; 901/1; 701/213, 215, 217, 23, 25, 24

[56] References Cited

U.S. PATENT DOCUMENTS

| | | | |
|---|---|---|---|
| 3,812,929 | 5/1974 | Farque | 180/98 |
| 4,620,285 | 10/1986 | Perdue | 180/167 |
| 5,029,294 | 7/1991 | Kim | 180/168 X |
| 5,301,617 | 4/1994 | Miwa et al. | 180/168 |
| 5,438,518 | 8/1995 | Bianco et al. | 364/460 |
| 5,524,081 | 6/1996 | Paul | 364/460 |
| 5,532,690 | 7/1996 | Hertel | 340/989 |
| 5,548,516 | 8/1996 | Gudat et al. | 364/443 |
| 5,563,786 | 10/1996 | Torii | 701/23 |
| 5,629,595 | 5/1997 | Salter et al. | 180/168 X |
| 5,757,316 | 5/1998 | Buchler | 701/215 X |

*Primary Examiner*—Lanna Mai
*Assistant Examiner*—Avraham H. Lerner
*Attorney, Agent, or Firm*—Flehr Hohbach Test Albritton & Herbert LLP

[57] ABSTRACT

A robotic golf caddy apparatus (21) movably supported on a steering assembly (28) and including a communications assembly (41) for communicating with a GPS system (61) and a central control station in order to guide and steer the apparatus around designated accessible areas of a golf course. The apparatus (21) also includes a dead reckoning system with distance determination device (83) and compass (85) for determining the distance the caddy travels should the communications assembly (41) lose communications with a predetermined minimum number of satellites in the GPS system (61). Also, a sensor (72a) is provided for detecting a guide tape or line (126,130), provided in preselected areas of the golf course. The caddy apparatus (21) is steered along the guide tape (126,130), rather than by the GPS system (61), in certain areas of the course where the GPS system (61) may be inadequate for maximum safe operation of the caddy apparatus.

21 Claims, 8 Drawing Sheets

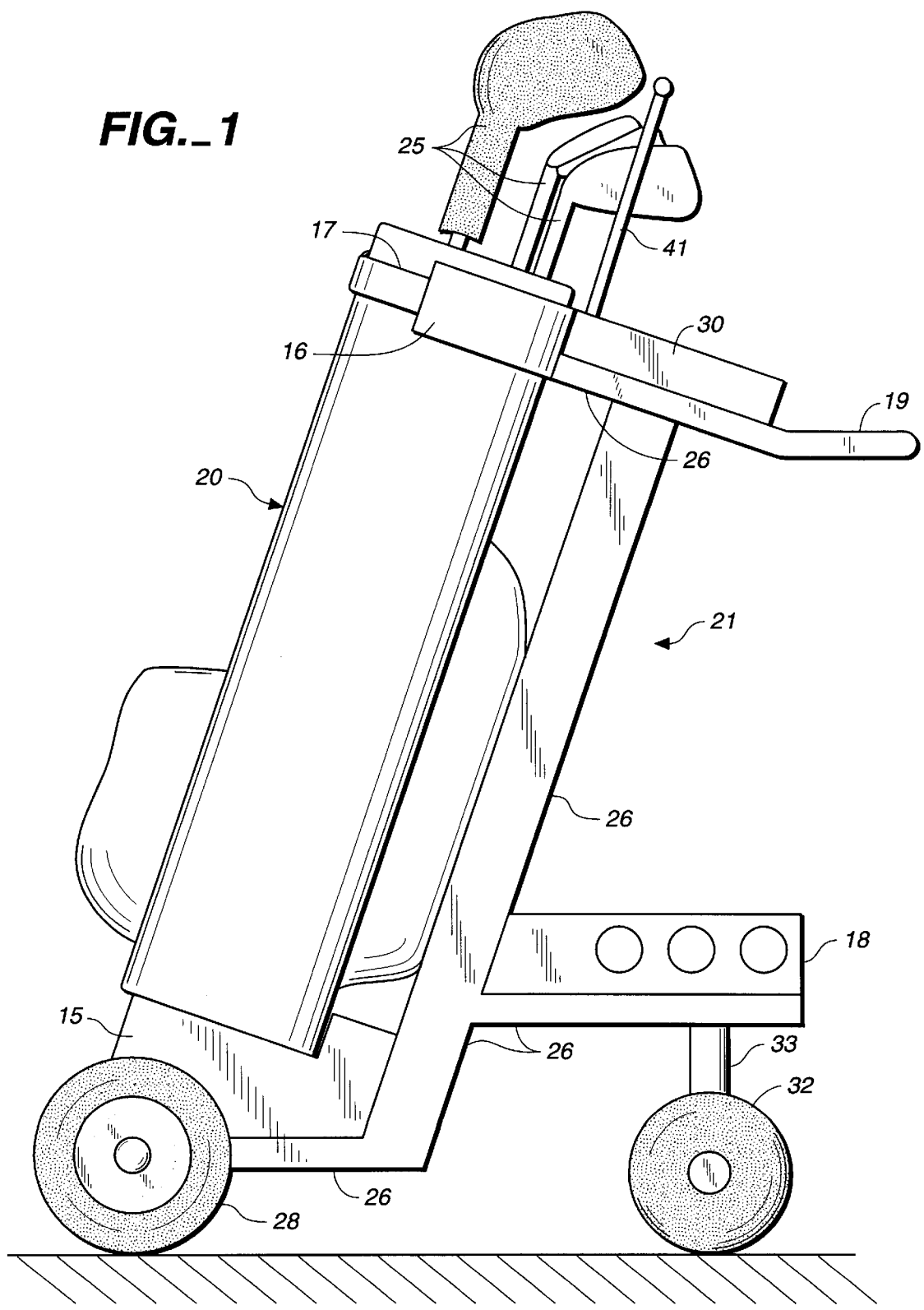
FIG._1

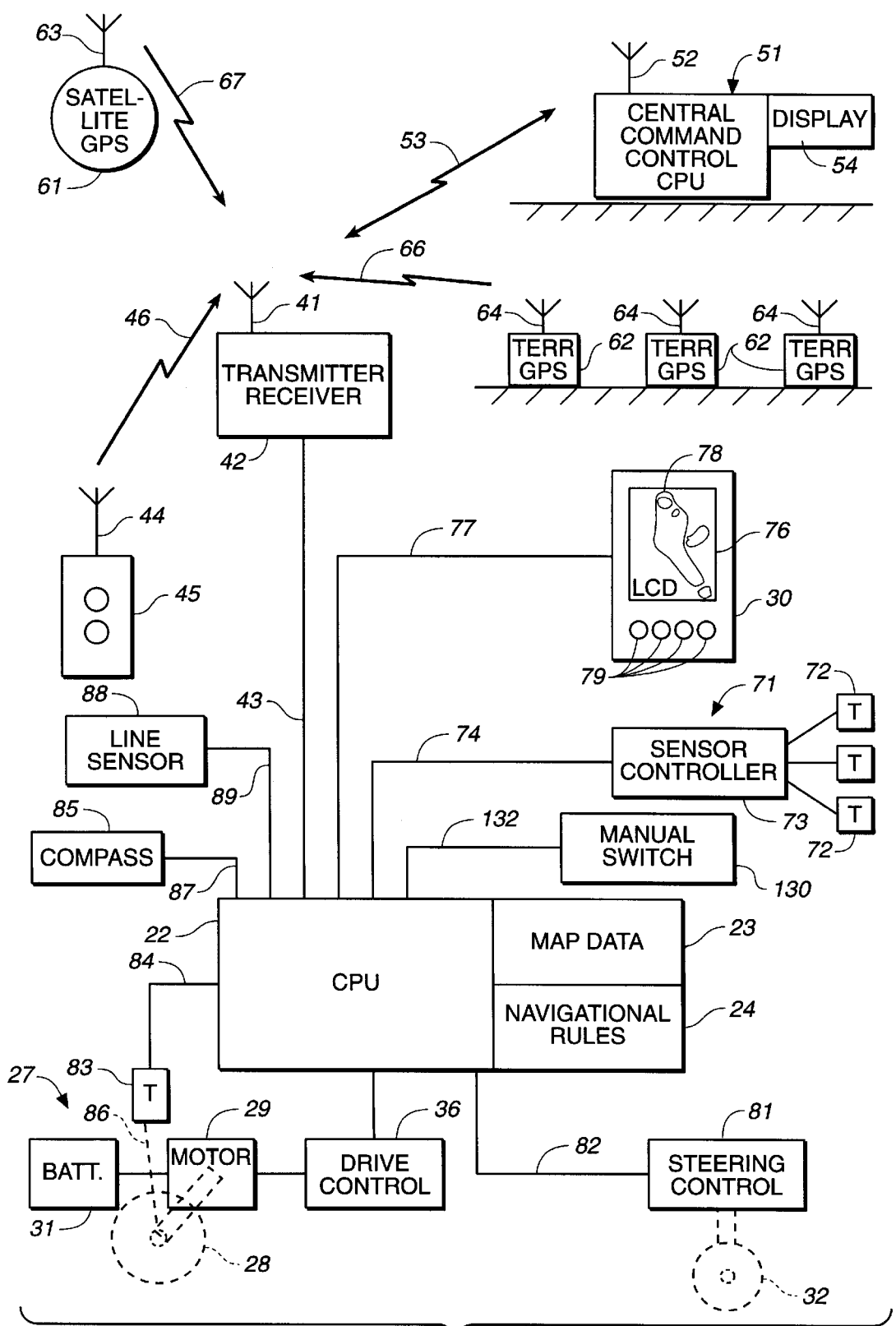
FIG._2

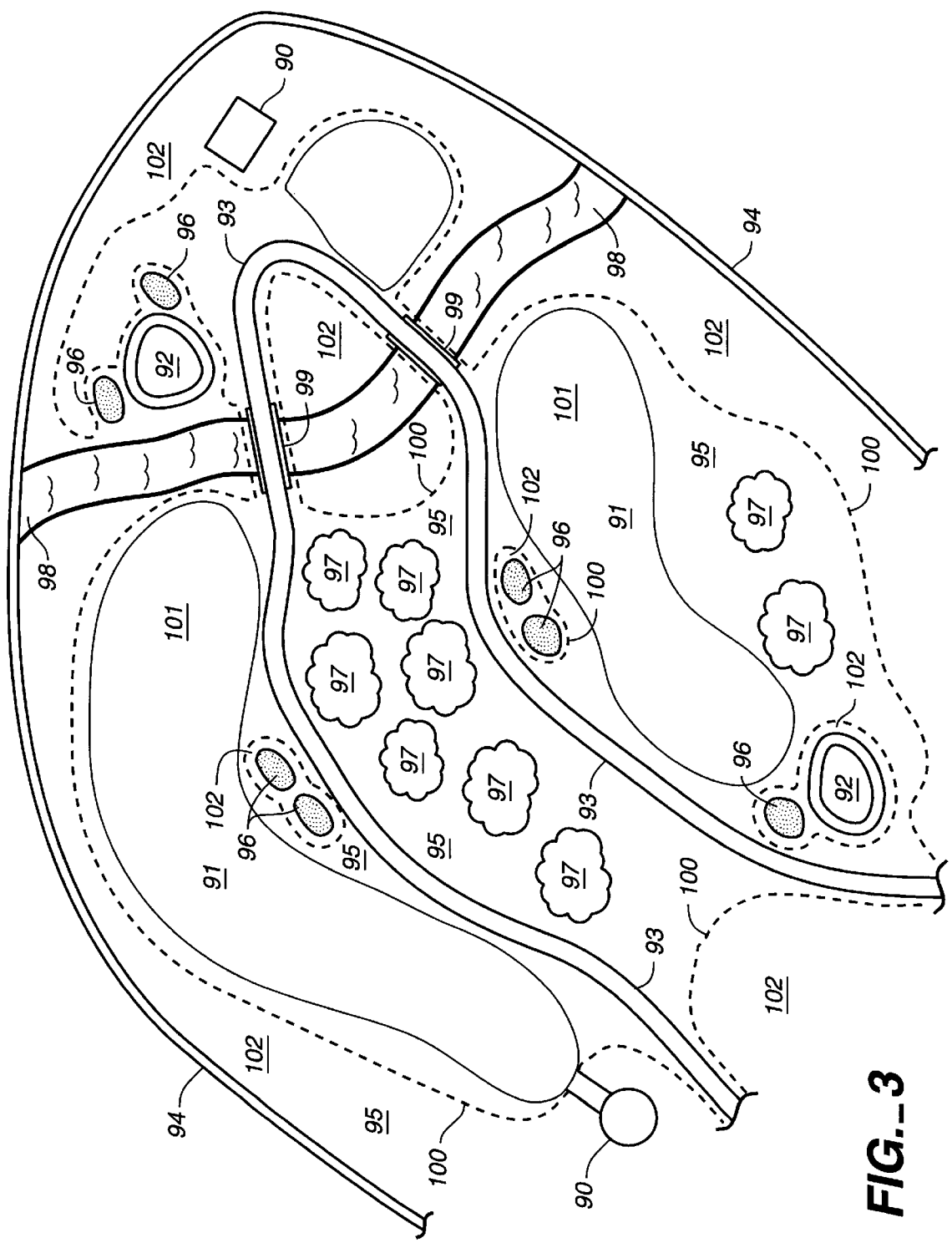
FIG._3

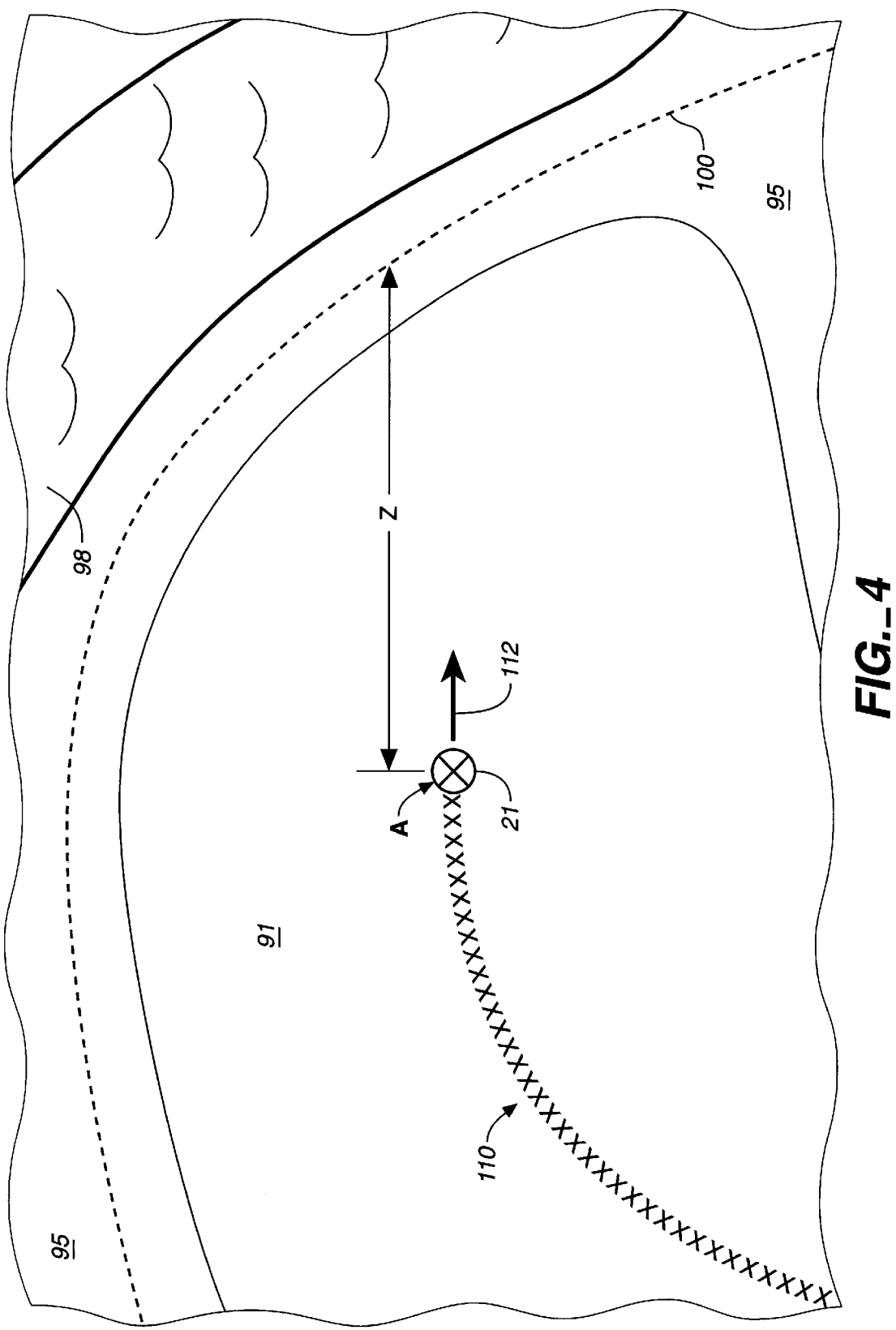
FIG._4

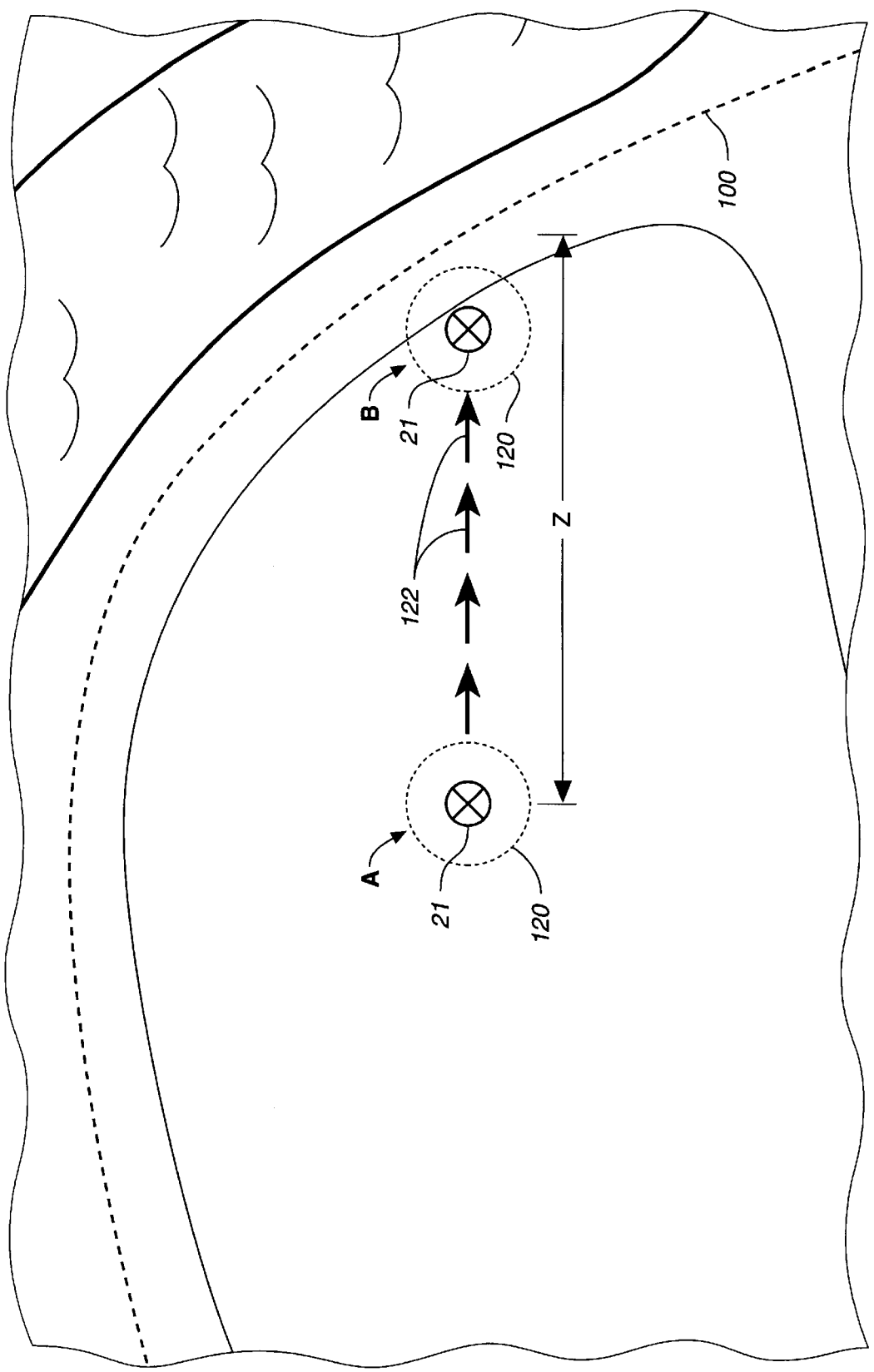
FIG._5

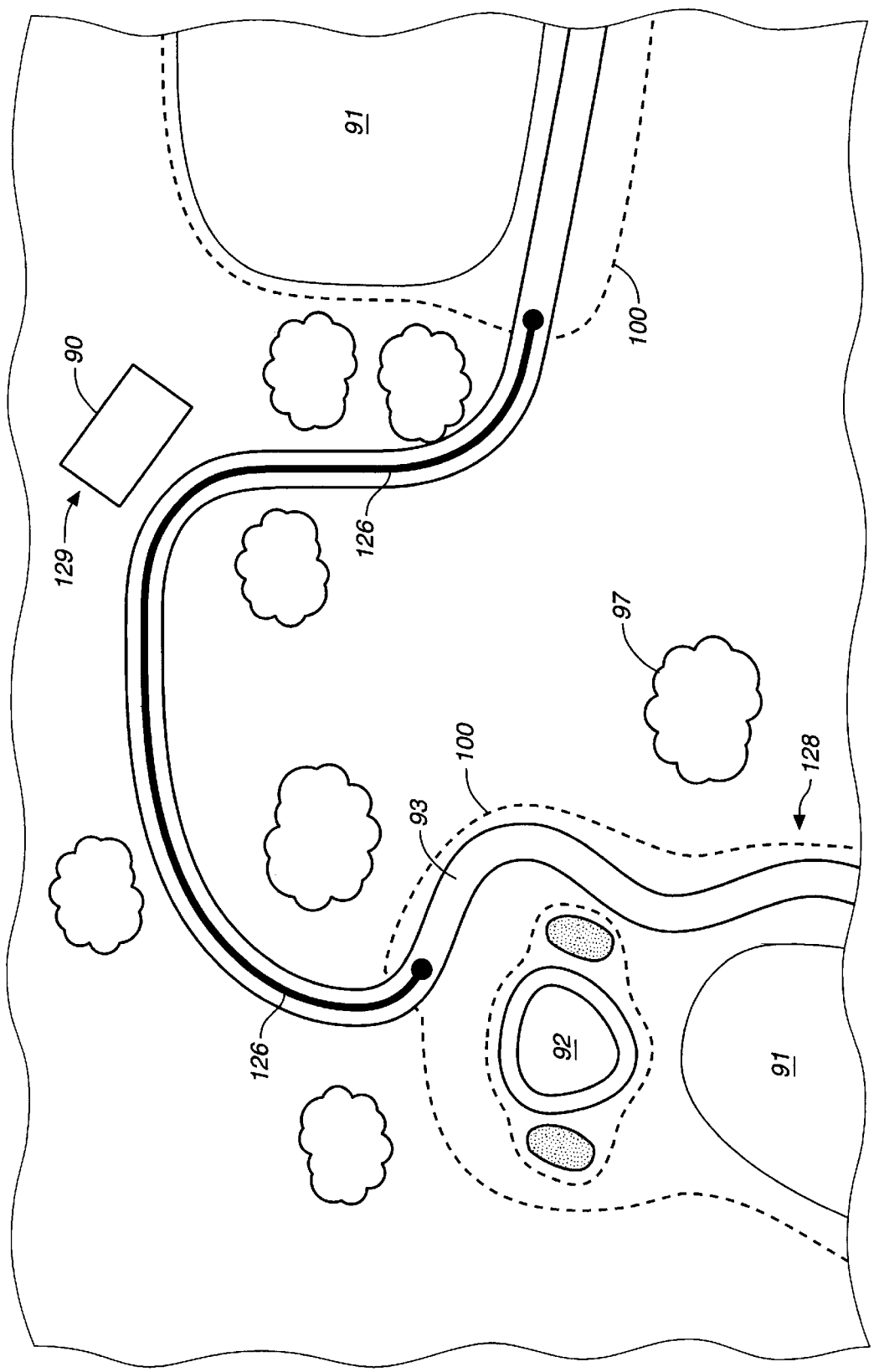
FIG._6

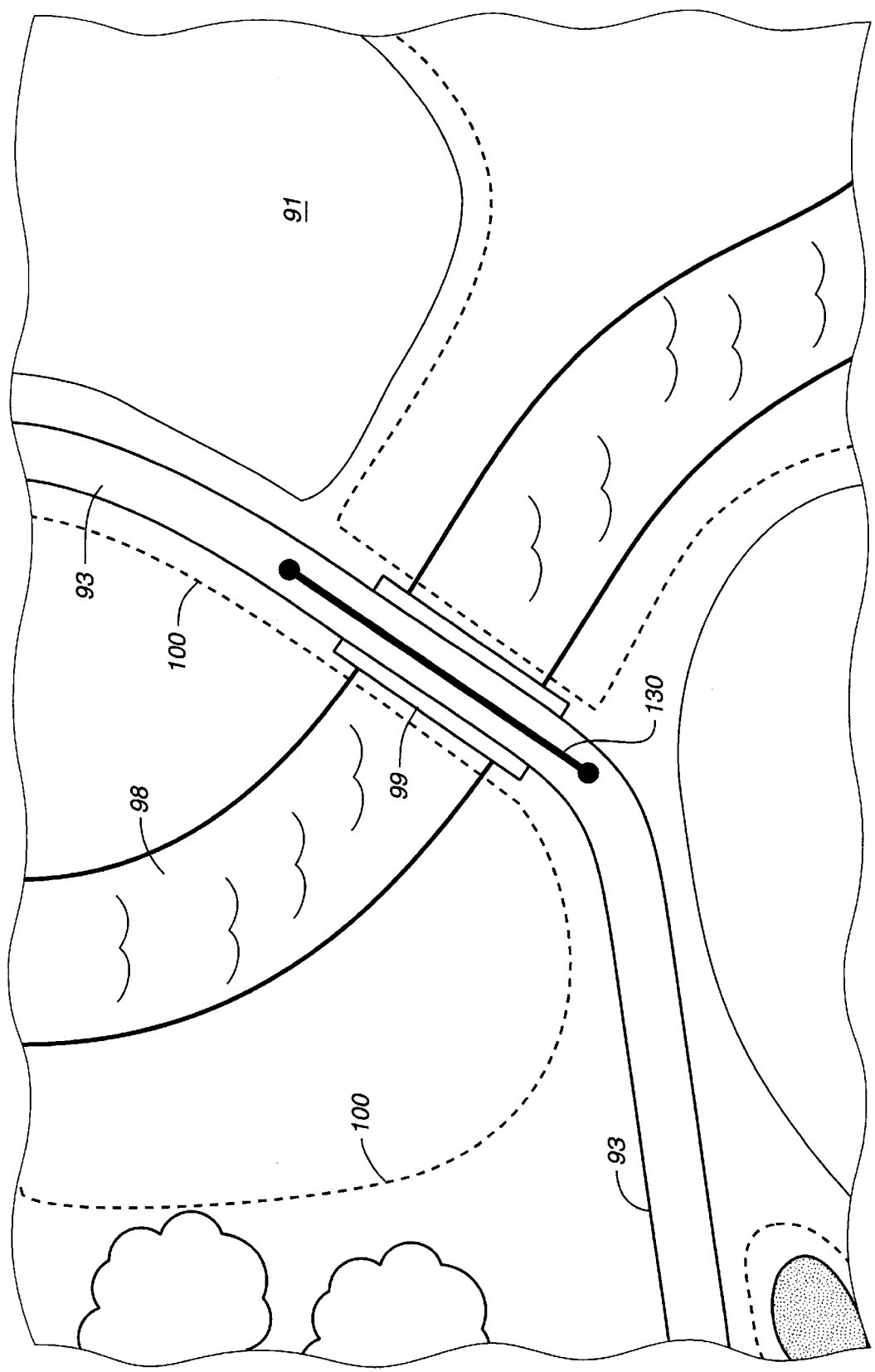
FIG._7

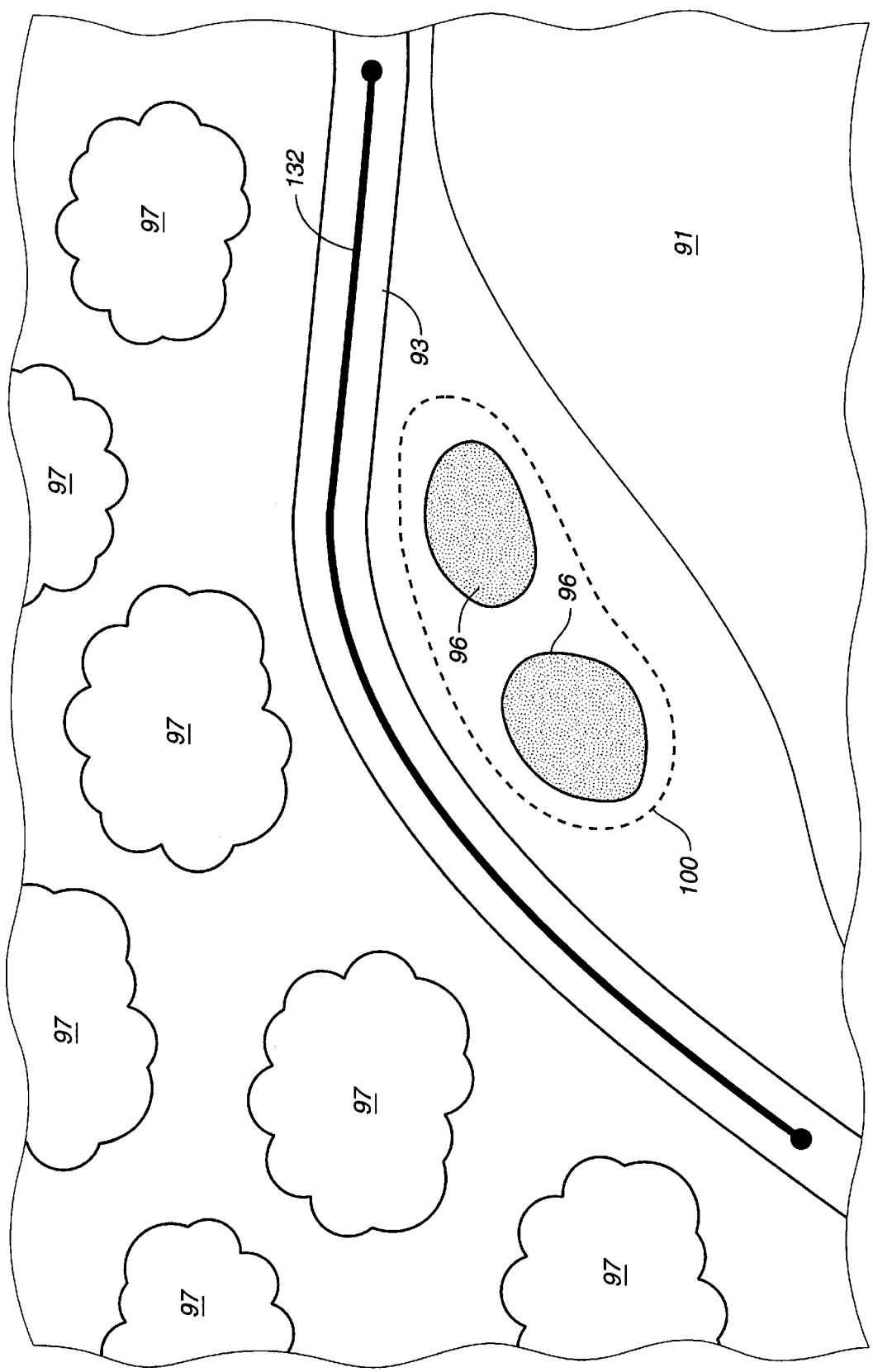
FIG._8

METHOD AND APPARATUS FOR CONTROLLING ROBOTIC GOLF CADDY APPARATUS

RELATED APPLICATIONS

This application is a continuation-in-part of my patent application entitled "Robotic Golf Caddy Apparatus and Method", Ser. No. 08/682,105, filed Jul. 17, 1996, U.S. Pat. No. 5,711,388, which claims the benefit of U.S. provisional application No. 60/001258, filed Jul. 20, 1995.

TECHNICAL FIELD

This invention pertains to methods and apparatus for controlling self-propelled, steerable robotic apparatus and, more particularly, to a method and apparatus for controlling a robotic, self propelled, steerable golf caddy apparatus.

BACKGROUND ART

My above referenced co-pending patent application discloses an autonomous, personal service, robotic apparatus that is particularly useful as a golf caddy apparatus. The robotic apparatus comprises a drive assembly, for propelling the robotic apparatus, and onboard electronics, including a digital computer and a memory device, which store map data of a golf course or other environment in which the robotic apparatus is to move, and navigational rules for controllably steering the robotic apparatus through the environment. A position or location determination assembly is part of the onboard electronics and functions to determine the location of the robotic apparatus in the environment. The position determination assembly works in conjunction with a differential GPS system to locate the robotic apparatus to within a relatively small error envelope or bubble, for example, within one cubic meter. The robotic apparatus further includes sensing apparatus that dynamically sense unmapped obstacles in the immediate vicinity of the robotic apparatus, to avoid collision therewith. The robotic apparatus also includes apparatus for sensing the location of a person, such as a golfer, or a second robotic apparatus, in the environment, and the stored navigational rules provide operational criteria for guiding the robotic apparatus relative to such person or other robotic apparatus.

The present invention improves upon the robotic apparatus of my forementioned patent application by providing an improved guidance system for steering the robotic apparatus, particularly when communication with a sufficient minimum number of satellites is temporarily lost.

DISCLOSURE OF INVENTION

Briefly described, the present invention comprises a method and apparatus of controlling a self-propelled, steerable vehicle through an accessible area with predetermined boundaries defining areas not accessible to the vehicle. In one aspect, the method comprises the steps of moving the object through the accessible area and within the predetermined boundaries, and while the vehicle is in the accessible area, using a GPS system having a multiplicity of satellites to determine the approximate location of the vehicle in the accessible area. The method further includes the step of steering the vehicle based in part on the determined approximate location of the vehicle using the GPS system. Should the number of viewable satellites from which signals can be received in the GPS system fall below a predetermined minimum number, then the following steps are performed until the number of viewable satellites increases to the minimum number:

(a) determining a safe distance that the vehicle can travel along a path, which distance is related to the position of the vehicle in relation to the boundaries of the accessible area, at the time the number of viewable satellites falls below the minimum number, and (b) steering the vehicle along the path and at the same time determining the distance the vehicle travels along the path after the time the number of viewable satellites falls below the minimum number using a distance determination device independent of the GPS system.

Once the number of viewable satellites increases to the minimum number, the method includes the step of continuing to steer the vehicle through the accessible area using the GPS system.

According to the invention, the step of steering the vehicle along a path preferably includes, stopping the vehicle should the distance the vehicle travels reach an acceptable safety level proportion of the determined safe distance. Preferably, the vehicle is movable by means of wheels and the step of determining the distance the vehicle travels is done by a distance determination device. The distance determination device counts the number of revolutions of at least one of the wheels of the vehicle and determines the distance traveled as a function of the number of revolutions.

The GPS navigation system has a margin of error based on the number of viewable satellites, and the acceptable safety level proportion has factored into it the margin of error of the GPS system.

According to another aspect of the invention, the computer controller includes a data storage device wherein a map of the accessible area, the inaccessible areas and the boundaries therebetween are charted and a set of navigational rules are stored, and a computer controller determines the location of the vehicle by triangulating the longitude, latitude and elevation of the vehicle.

According to a further aspect of the invention, the step of determining the location of the vehicle is further performed by sending signals from the GPS system to a stationary receiver, the location of which in relation to a map of the accessible and inaccessible areas is known. The approximate location of the stationary receiver is then determined and the known location of the stationary receiver is compared to the determined approximate location of the stationary receiver to create an error figure. The determined approximate location of the vehicle is adjusted by the error figure.

Preferably, the vehicle further includes a compass and the step of continuing to move the vehicle includes the step of continuing to move the vehicle in the direction determined by the direction the vehicle was heading when the number of viewable satellites fell below the minimum number, and the step of determining a safe distance includes determining the distance to the nearest boundary in the direction that the vehicle is heading minus an envelope of possible error.

According to another embodiment, the present invention comprises a method and apparatus of controlling a self-propelled, steerable vehicle through an accessible area with predetermined boundaries defining areas not accessible to the vehicle by moving the vehicle through the accessible area and within the predetermined boundaries. While the vehicle is in the accessible area, a GPS system having a multiplicity of satellites is used to determine the approximate location (within one meter) of the vehicle within the accessible area. The vehicle is steered based in part on the determined approximate location of the vehicle using the GPS system. A detectable guide mechanism is provided in preselected areas of the accessible area, and when the vehicle is within a preselected area, the location of the detectable guide mechanism is sensed by a sensor carried on the vehicle. The vehicle is steered along the detectable guide mechanism in response to the sensed location of the guide mechanism, not withstanding the possible availability of GPS navigation. When the vehicle leaves the preselected area, the vehicle is steered again by use of the GPS system.

The preselected areas are areas where steering of the vehicle by use of the GPS system may be difficult, or areas where communication with a predetermined minimum number of satellites is difficult, or areas whose boundaries are narrower than the margin of error of the GPS system.

Preferably, the detectable guide mechanism extends along a path, and the vehicle is steered along the path in close proximity with the guide mechanism.

The invention also comprises a self-propelled, steerable vehicle that includes a frame movably supported for travel in a designated accessible area, a computer control assembly carried on the frame for controlling movement of the frame in the accessible area, and a communications assembly carried on the frame for communicating with a GPS system having a predetermined minimum number of viewable satellites. The communications assembly uses the GPS system to approximate the position of the vehicle within the accessible area, and also communicates with at least one local source in order to guide the vehicle in close proximity to the local source. A distance determination device is carried on the frame for determining the distance traveled by the vehicle when communication with GPS system is temporarily interfered with.

These and other features, objects, and advantages of the present invention will become apparent from the following description of the best mode for carrying out the invention, when read in conjunction with the accompanying drawings, and the claims, which are all incorporated herein as part of the disclosure of the invention.

BRIEF DESCRIPTION OF THE DRAWINGS

Throughout the several views, like reference numerals refer to like parts, wherein:

FIG. 1 is a schematic side elevation view of an autonomous robotic caddy apparatus constructed in accordance with the present invention;

FIG. 2 is a block diagram of the major components of the robotic caddy apparatus of FIG. 1;

FIG. 3 is a schematic aerial view of two golf course holes, illustrating the various accessible and inaccessible areas thereof and the predefined boundaries defining the two areas;

FIG. 4 is a detail aerial view of a portion of one of the golf holes of FIG. 3, showing the robotic caddy apparatus and its relationship to its nearest predefined boundary;

FIG. 5 is a view like FIG. 4 of a portion of the same golf hole, showing the error bubble of the robotic caddy apparatus;

FIG. 6 is a schematic aerial view illustrating the line follower feature of the present invention as it is employed to guide the robotic caddy apparatus between adjacent golf holes;

FIG. 7 is a schematic aerial view illustrating the line follower feature as employed to guide the robotic caddy apparatus over a bridge;

FIG. 8 is a schematic aerial view illustrating the line follower feature as employed to guide the robotic caddy apparatus in an area where signals from one or more of the satellites of the GPS system may be blocked due to trees or other obstacles.

BEST MODE OF CARRYING OUT THE INVENTION

Reference will now be made in detail to the preferred embodiments of the invention, examples of which are illustrated in the accompanying drawings. While the invention will be described in conjunction with the preferred embodiments, it will be understood that the described embodiments are not intended to limit the invention specifically to those embodiments. On the contrary, the invention is intended to cover alternatives, modifications and equivalents, which may be included within the spirit and scope of the invention as defined by the appended claims.

The Caddy Apparatus

Referring to FIG. 1, a personal service robotic caddy apparatus, generally designated 21, is shown carrying a golf bag 20 having a plurality of clubs 25 carried therein. Robotic caddy apparatus 21 includes a frame 26 on which a base housing 15 is supported. Bag 20 is supported on housing 15 and is encircled at its an upper end by movable arms 16 and a releasable fastener 17, as is conventional for golf pull carts. Caddy apparatus 21 advantageously is designed to support two side-by-side golf bags, and arms 16 are displaceable to substantially grip or engage one or both of the bags. The particular design of golf bag 20, clubs 25 and frame 26 form no part of the present invention and those skilled in the art will recognize various equivalent designs for these components that are suitable for use with the present invention.

A pair of rear drive wheels 28 and a pair of steerable front wheels 32 movably support frame 26. Front wheels 32 mount to a vertically extending post 33 that is part of frame 26. As discussed in more detail later, steering of caddy apparatus 21 can be achieved either by controllably steering front wheels 32 or by separately controlling the rotational speed and direction of rear wheels 28. It should also be noted that any suitable movable support assembly can be utilized to provide movement of the caddy apparatus of the present invention.

Caddy apparatus 21 further includes a housing 18, which houses a dynamic sensing apparatus described later, a manual operation handle 19 for manual override control of the caddy apparatus, and a display housing 30 for housing a display monitor.

A plurality of communications antennas, collectively represented by reference numeral 41, are mounted on top of frame 26. Antennas 41 receive signals from a global positioning satellite (GPS) system and from a central command controller, discussed later. Signals received via antennas 41 are utilized by onboard electronics to determine the position of the caddy apparatus in its environment, i.e. the golf course.

In FIG. 2, the basic components that control operation of caddy apparatus 21 are shown in block diagram form. The control components include a general purpose computer 22 that has a central processing unit (CPU), preferably at least a 486 Intel processor or CPU of similar processing capacity. Computer 22 also includes memory storage devices, such as a golf course map data memory 23 and navigation rules memory 24. Computer 22 can be positioned on framework 26 either in base housing 15 or sensor housing 18.

Caddy apparatus 21 includes an electric drive assembly 27 for powering rear wheels 28. Electric drive assembly 27 includes storage batteries 31, an electric motor 29, and a motor controller 36. Motor controller 36 interfaces between computer 22 and electric motor 29 to enable precise speed control of each rear drive wheel 28. A steering control mechanism 81 may be provided to steer front wheels 32. Communications line 82 connects steering control mechanism 81 to computer 22. Steering can be accomplished by operating drive wheels 28 at differing relative speeds or by steering front wheels 32 via control 81.

In order to provide additional information as to the position of robotic caddy 21, a distance determination device in the form of an odometer or mileage transducer 83 is provided. Mileage transducer 83 is connected via electrical signal communications line 84 to computer 22 and coupled mechanically at 86 to one of the rear drive wheels of the caddy apparatus. Transducer 83 is used primarily during a "dead reckoning" operation mode of the caddy apparatus, discussed later. Other suitable distance determination devices known in the art can be provided in lieu of an odometer or similar type of mileage transducer.

A compass 85 is connected via communications line 87 to computer 22 and may be utilized during the dead reckoning mode to more accurately control movement of the caddy apparatus. A line sensor 88 is connecter to computer 22 via communications conductor or line 89 and is utilized as part of a line follower feature of the present invention, also discussed in more detail later.

Additional components of the caddy apparatus are also found in the above-referenced parent application, which is incorporated herein in its entirety by reference. Moreover, various components are discussed later in connection with the communications system, the map data, dead reckoning mode, and the line follower features.

The Communications System

Communication antenna 41 is coupled to a transmitter receiver 42, which includes a signal processor that processes signals transmitted between receiver 42 and computer 22, via a communications line 43. Antenna 41 is designed to receive GPS signals 67 from an array of GPS satellites, collectively represented by reference numeral 61. Antenna 41 preferably is a six or eight channel receiver capable of receiving signals from six or eight satellites 61 at any one time, which enables the location of the caddy apparatus to be fixed by a triangulation method.

Antenna 41 may receive position signals from either satellite-based transmitters, like satellites 61, or terrain-based positioning transmitters, such as transmitters 62. Terrain-based GPS positioning has thus far not been as cost effective or reliable as differential satellite-based GPS for golf caddy applications. It will be understood, however, that in other applications such terrain-based GPS may have advantages. As used in the claims herein, the "GPS" is meant to include either satellite-based positioning systems or ground-based positioning systems, or any combination thereof. Satellites 61 each include an antenna 63 for transmitting signals to and from antenna 41. Satellites 61 may be provided by the NAVSTAR group of satellites that circle the earth and permit earth-based receivers to triangulate the longitude, latitude and elevation of earth-based receivers. There are currently twenty one such satellites in orbit that are being used for many applications in what is well known as a "Global Positioning System" (GPS).

Since GPS sensing is typically only accurate to ten to thirty meters, robotic caddy apparatus 21 preferably utilizes a differential GPS location fixing method. Location fixing by a differential GPS system is well known and will only briefly be discussed herein. Differential GPS incorporates a fixed location command control station 51 into the communications network between caddy apparatus 21 and satellites 61. Like caddy apparatus 21, command control station 51 receives position signals from the GPS satellites to determine an apparent location of the station. Since command control station 51 is at a fixed and known local location, the difference between the station's apparent location, as determined by the satellites, and its actual, known location provides an error or differential that, in turn, can be used to correct the apparent location of the caddy apparatus, as perceived by the GPS system. Thus, command control station 51 acts as a local source for providing a communication signal to the communication system of the caddy apparatus.

While conventional direct GPS positioning generally enables fixing the location of robotic caddy apparatus 21 within an error range of plus or minus ten to thirty meters, differential GPS allows the position of the robotic caddy to be determined with an accuracy of plus or minus about one meter, and sometimes less. The correction or differential error can be signaled to the caddy apparatus from the command station approximately once per second, so that the caddy apparatus can nearly continuously correct for and minimize the error inherent in the GPS system.

For many golf courses or other installations, a single command station transmitter antenna 52 can directly transmit a differential correction figure to caddy antenna 41, via a signal 53, no matter where on the golf course the caddy apparatus is located. However, for some locations on the course, it may not be possible to directly transmit signals between the central command station and the caddy apparatus, due to terrain undulations, buildings and other obstacles. In these instances, repeater transmitters can be stationed around the golf course at strategic locations so that all positions on the course will be able to receive a signal, either directly or indirectly from the central command station. As shown in FIG. 2, therefore, transmitters 62, each with an antenna 64, can be utilized as repeater stations or relays, which receive differential or correction signals 53 from station 51 and then rebroadcast them as signals 66, which are in turn received at antenna 41.

In applications in which there is a person (i.e. a golfer) or other robotic device with which caddy apparatus 21 interacts, antenna 41 and transmitter receiver 42 are further adapted to receive signals 46 from a portable transmitter 45, such as a radio frequency transmitter beacon carried by a golfer. Signals 46 allow the caddy apparatus to steer itself relative to the location of the golfer, according to the navigation rules stored in the computer.

In order to determine the bearing and distance of the golfer's beacon or transmitter 45 from robotic caddy 21, it is preferable that a triangular antenna array be employed for antenna 41. The locator processor of transmitter receiver 42 processes beacon signal 46 as received through the three antennas of antenna array 41. The locator processor uses the phase relationship of receipt at antenna 41 to determine the bearing and the amplitude of the respective signals. Preferably, timing of the signal receipt is not used in the system. However, the geometry of the antennas can provide a diversity receiver topology, guaranteeing that at least one antenna will be near a phase augmentation peak at all times, meliorating the effects of multipath fading in the ranging scheme.

The navigational rules stored in memory 24 do not require that extreme precision be achieved in locating the golfer with respect to the robotic caddy. It is sufficient that the robotic caddy can determine which general mapping zones the golfer is in and the golfer's approximate location within these zones so that the caddy can move to a position conveniently proximate the golfer.

In addition to obtaining the differential correction signal from command station 51, caddy apparatus 21 can transmit a location signal back to the command station, so that the position of each robotic caddy on the course will be known at the central command station. Additionally, central control station 51 has the ability to change the course map data and/or the navigational rules. Thus, if the boundaries between accessible and inaccessible areas on the golf course change, for example when an area is being reseeded, the stored data in memory 23 can be reprogrammed to ensure that the caddy apparatus stays within accessible areas.

The robotic caddy apparatus of the present invention further includes an ultrasonic sensor assembly 71 for dynamic sensing of moving or otherwise unmapped objects or elements. Sensor assembly 71 includes a plurality of transducers 72 that are connected to a sensor controller 73, which, in turn, is coupled via communications line 74 to computer 22. Uncharted objects in proximity to the caddy apparatus, which could damage the caddy apparatus in a collision, are sensed by transducers 72, causing sensor controller 73 to send an appropriate signal alerting computer 22 of the approximate location of the object relative to the caddy apparatus. The computer then charts a course around the object or stops the caddy apparatus. Thus, stationary objects like trees, bushes, benches, poles, and fences, objects too numerous and/or small to be mapped, can be avoided. In addition, sensors 72 sense movable objects, such as other golfers, riding carts, animals, etc.

The sensor system of the caddy apparatus may be sonar based of the type using occupational grid analysis to develop a map of surrounding objects, or the sonar system may be designed to more dynamic, looking for moving objects that could collide with the caddy apparatus, or fixed objects that the caddy apparatus could collide with, and changing direction or heading accordingly.

The Course Map Data

The environment in which the robotic apparatus is to operate is mapped and a file containing this map is stored in memory 23. The map data can be generated in a number of different techniques well known in the art. One approach is to take digitally-enhanced orthophotos of a golf course layout. Precise coordinates for various course features and areas are then charted and designated inaccessible to the caddy apparatus and are programmed into the course map file.

Referring to FIG. 3, a couple of adjacent golf holes, conventional in design, are shown schematically from an aerial viewpoint. Each hole includes a tee box 90, a fairway 91, and a green 92. A cart path 93 runs along each hole in close proximity to the tee box, fairway, and green of each hole. Additional course features include out-of-bounds 94, rough areas 95, sand traps 96, trees 97, a creek 98 and bridges 99.

Dashed lines 100 represent predefined map boundaries that define accessible areas 101 and inaccessible areas 102 for the robotic caddy apparatus. The accessible areas generally include the areas in and around fairways 91 and the areas around the outer perimeter of greens 92. The caddy-inaccessible areas generally include the rough areas 95 adjacent out-of-bounds 94, the areas in and around tee boxes 90, the greens 92, the sand traps 96, and the area bordering creek 98. Bridges 99 are caddy-accessible and are discussed in more detail with reference to FIG. 7. The specific areas charted as accessible and inaccessible is entirely discretionary. It will be understood, however, that many caddy-inaccessible areas are accessible to the golfer. Moreover, changes or modifications to the foregoing designations are feasible and may even be desirable for certain courses. For example, some courses have waste bunkers that may be labeled as accessible. Labeling an area accessible depends primarily on the actual, physical ability of the caddy apparatus to propel itself into and out of a particular area, as well as the desirability of allowing such access. As another example, tees and greens are perfectly accessible, but it is not desirable to allow caddy access to these areas. The location of dashed lines 100 is charted as part of the course map data programmed into the computer memory.

In order to assist in navigation, the map data stored in memory 23 advantageously can include a plurality of differing zones with identifying navigational codes or numbers. A No. 1 zone, for example, might comprise an area which the robotic caddy cannot enter on its own under any conditions. Thus, barrancas, lakes, sandtraps, greens and tee boxes might all be zone 1 areas on the digitized stored map. A zone 2 area might be areas in which the robotic device is free to enter and navigate automatically in accordance with its stored rules of navigation. Examples might include fairways and pathways between greens and the tees. A zone 3 area might be a holding or parking position, such as an area proximate the tee to which the robotic device proceeds and parks when the golfer enters the area of the tee box. Other zone 3 areas might include battery charging areas proximate the clubhouse and caddy parking areas at the clubhouse proximate the first tee for loading of clubs onto the robotic caddy. A zone 4 area might be the parking lot in which only manual operation is possible.

In any event, the digitized map defines the areas in which navigation is possible or prohibited or subject to special rules, as such areas are identified by coded zone designations.

Dead Reckoning Mode

In FIG. 4, caddy apparatus 21 is shown positioned in a fairway 91 and its path of travel 110 is shown by a progression of little x's. Path of travel 110 is determined by the navigation rules stored in the computer of the caddy apparatus. At the position shown in FIG. 4, caddy apparatus 21 is moving in the direction indicated by arrow 112.

As caddy apparatus moves around within the accessible area of the golf course, the number of satellites that its antenna can see and communicate with may vary. For example, the caddy apparatus may travel underneath a tree, through a tunnel, past a building, or into a canyon, any of which can block the satellite signals from being received by the caddy apparatus. Ideally, the number of viewable satellites never falls below a predetermined level, usually four satellites. By "viewable" it is meant the satellites whose transmitted position signals are received by the antennas of the caddy apparatus. However, a minimum safe number of satellites may also be selected as five or three, but preferably at least four satellites are viewable at all times. However, the present invention is not meant to be limited to a particular minimum number of satellites for safe operation of the caddy apparatus.

Should the number of viewable satellites fall below four, the preselected minimum number for safe operation, in the improved caddy apparatus switches into a "dead reckoning" mode. This point in time is shown as point A in FIG. 4. When dead reckoning begins, caddy apparatus 21 first determines the distance to the nearest boundary 100 in the direction that the caddy apparatus was heading at point A when the number of viewable satellites dropped below four. This distance is represented by arrow Z. Caddy apparatus 21 continues to move along a path determined by its last GPS location and the distance to boundary 100, for example, the distance Z on its last heading, indicated by arrow 112. As the caddy apparatus moves, odometer or transducer 83 associated with one of its rear drive wheels senses the number of revolutions of the wheel and this number is used by the computer to determine the distance traveled by the caddy apparatus along heading 112 after the caddy apparatus lost sight of the fourth satellite. Alternatively, another type of distance determination device could be used for purposes of tracking the distance traveled by the caddy apparatus.

If the caddy apparatus is able re-establish communication with a fourth satellite before traveling the entire distance Z, then normal operation of the caddy apparatus using the GPS system continues according to the navigational rules. However, should the caddy apparatus approach boundary 100 before re-establishing communication with a fourth satellite, the caddy apparatus is programmed to stop and wait for a fourth satellite to become viewable again or until the golfer returns to the caddy apparatus to manually control the same. By "approaching boundary 100" it is meant that the caddy apparatus travels along its path 112 associated with distance Z for a distance that is an acceptable safety level proportion of distance Z. For example, if distance Z is fifty meters and the safe margin of error of the GPS system is five meters, than the caddy apparatus can safely travel forty-five meters, or 90% of distance Z. 90% is the safety level proportion.

If desired, the golfer may assume manual control of the caddy apparatus until a fourth satellite is available. Alternatively, caddy apparatus 21 can be programmed to move in a different manner when it loses sight of a fourth satellite. For example, the caddy apparatus could move in a direction different from heading 112 at the time of, or soon after, losing sight of a fourth satellite. The caddy will keep track of its new heading and transducer counted wheel turns on the heading to stay within mapped boundary 100.

A useful alternative method of controlling the caddy apparatus when sight is lost of four satellites is an iterative process that assumes that the altitude of the caddy apparatus has not changed significantly since the last location calculated. And this assumption is generally valid for golf course areas designated accessible for the caddy apparatus because golf courses have generally smoothly undulating terrain free of spikes or sharp elevation changes. The caddy apparatus iterates to calculate the altitude from the terrain map stored in its memory. The caddy apparatus pretends that there is a fourth satellite out there, the distance from which is assumed not to have changed from the last calculation. This assumed distance is utilized with the three additional signals from the viewable satellites to determine the XY location of the caddy apparatus. Of course the caddy apparatus knows the actual altitude for each given XY location and this known altitude becomes the new assumed altitude for the next calculation. The process continues iteratively until communication is reestablished with the fourth satellite or until the golfer assumes manual control.

Preferably, the compass of the caddy apparatus is utilized in conjunction with the dead reckoning mode, to allow the caddy apparatus more freedom of movement during the period when less than four satellites are viewable. The compass allows the computer to redirect the caddy apparatus, according to a modified set of navigational rules, until communication is re-established with four satellites. However, guiding the caddy apparatus by compass is less reliable than dead reckoning without a compass. Factors such as wind, slippery terrain and incline, gravity and ferromagnetic masses can all affect the actual movement of the caddy apparatus, which movement would not necessarily be reliably detected by a compass or an odometer.

It should be noted that movement of the caddy apparatus during dead reckoning is controlled by a modified set of navigational rules discussed later. Briefly, during dead reckoning, the caddy apparatus still receives signals from the golfer's beacon, which in turn steers the caddy apparatus to stay in close proximity to the golfer, albeit along a more limited path. For example, the caddy apparatus stops during dead reckoning if the golfer stops and starts moving again when the golfer does. Moreover, the golfer beacon signals can cause the caddy apparatus to change its heading. Still further, when the caddy apparatus reaches a boundary 100, or its error bubble reaches boundary 100, the beacon may cause the caddy apparatus error bubble 120 to follow boundary 100 as the golfer moves around the golf course.

FIG. 5 illustrates a designated safety bubble 120 for caddy apparatus 21, which safety bubble is a factor in determining the desired safety level proportion of distance Z. Depending on the number of satellites that are viewable, the accuracy of differential GPS positioning can, in a sense, be considered to be one meter or better. In fact, the GPS system has been designed in such a way as to skew the distribution of position solution error in favor of accurate latitude and longitude at the cost of increased error in altitude. This is a design option and is not necessary to guide the caddy apparatus. Consequently, a typical error envelope or bubble would not be measured as a spherical "bubble" of one meter radius, but rather as an elongated ellipsoid with its minor axes in the plane of the ground surface, with its major axis projecting out of the ground at some acute angle to a radius from the center of the Earth. For minor axes on the order of ±one meter on the ground, the major axis may often be greater than ±twenty meters, even in differentially corrected systems.

The error bubble requires that caddy apparatus 21 be treated as if it were a larger object than it really is, i.e. an object with a radius approximately equal to the margin of error of the GPS system. In FIG. 5, caddy apparatus 21 is shown having traveled from point A to point B, in the direction of arrows 122. During all navigation, but particularly during dead reckoning navigation, should caddy apparatus 21 approach boundary line 100 before a fourth satellite is within view, safety bubble 120 causes the computer to treat caddy apparatus 21 as a much larger object, to allow for a margin of error. If desired, the computer can be programmed to increase the size of error bubble or envelope 120 when the caddy apparatus switches to dead reckoning and can further stop the caddy apparatus when it reaches a predetermined safe distance short of boundary line 100. In other words, when the caddy apparatus has traveled a portion of distance Z, it can be programmed to stop, to either wait for a fourth satellite or to allow for manual operation of the caddy apparatus. An audible signal also can be emitted in such an event, either at the caddy apparatus and/or at the golfer's beacon.

The Line Follower Feature

FIG. 6 illustrates a line follower feature of the present invention. In certain areas of the golf course, it is preferable to have the caddy apparatus follow the cart path, or another designated path, rather than direct itself in free following mode using the GPS system. A guide tape is embedded in (or secured to) cart path 93 or adjacent the cart path, along line 126. After a golfer completes play of hole 128 and moves off of green 92, the caddy apparatus follows the golfer toward cart path 93. In this area, the caddy apparatus moves along a preset route that leads to line 126. This is another example of an area on the golf course where it is best to guide the caddy apparatus, via the GPS system, along a preselected route, rather than by means of the navigational and behavior rules of free following mode. With a preselected route that leads to line 126, the caddy apparatus can quickly and efficiently find the line.

As the golfer walks on cart path 93 toward the next golf hole 129, the caddy apparatus follows the golfer onto the cart path and senses the guide tape embedded along line 126. The caddy apparatus follows the line of tape, first to tee box 90 of hole 129, and then into the accessible area in and around fairway 91 of hole 129. In this manner, the guide tape acts as a detectable guide mechanism for guiding the caddy apparatus through selected areas of the course.

Line 126 includes markers along its length that indicate to the caddy apparatus where along the line the caddy apparatus is located. This is important, first, to ensure that the caddy apparatus is moving in the right direction along the line, and also to indicate when the caddy apparatus has reached the end of the line. The first mark encountered serves to "collapse" the location of the caddy, enabling the dead reckoning system to reset its estimate of position error. The caddy apparatus continues to use its integrated GPS/dead reckoning solution to estimate its progress along the line as it moves, while the marks are used as landmarks to reset the dead reckoning error estimate that grows whenever the caddy is moving in dead reckoning mode. At the end of the line, it may be desirable to have another pre-programmed route that leads the caddy apparatus from the line to an area of the fairway, for example, where free following mode can resume.

FIGS. 7 and 8 illustrate two additional areas of a golf course where the line follower feature may be desirable. In FIG. 7, a guide tape is provided across a bridge 99 along line 130. The tape across the bridge is mainly a safety feature, due to the margin of error of the GPS system being greater than the width of the cart path, and is not necessarily related to the number of viewable satellites. In FIG. 8, a guide tape is provided on cart path 93 along line 132. The close proximity of trees 97 may obstruct the caddy apparatus's view of one or more satellites. Tape would also be used through tunnels, past buildings, and perhaps in valleys and canyons where a hill or mountain could block view of a satellite.

Guide tape can take several forms. It can be magnetic, electric or optically sensible, depending upon the sensor 72a carried by the caddy. The caddy transducer 72a usually will be downwardly oriented to sense the presence of a guide tape on the "ground" and in the preferred embodiment caddy apparatus 21 will be controlled by the line guiding tape in a manner which overrides any GPS signals even when more than enough satellites are received. Thus, in areas where guide tape is placed, the caddy apparatus follows a modified set of navigational rules, in that its path of travel is limited to the path defined by the tape, but the caddy apparatus still receives signals from the golfer's transmitter and moves along the tape in close proximity to the golfer.

It also may be desirable with certain golf courses to install beacon stations at points on the golf course where augmented communication with the caddy apparatus will facilitate more precise control of the apparatus. For example, a golf course may have an area where there is no cart path, yet which is narrow enough in its layout to challenge the limits of the GPS system. For such an area, beacon stations can be placed on either side of the narrow terrain and the caddy apparatus can be programmed to guide itself relative to the signal received from the beacon of the beacon station. The signal from the beacon station can be coded with a unique number sequence to indicate that it is a signal from a ground based beacon, as opposed to a satallite or control station signal. When the caddy apparatus approaches the narrow area, instead of looking for a line signal to follow, it is programmed to look for a particular beacon signal.

The relay system that retransmits signals between the caddy apparatus and the command station can be designed to be self-configuring so that upon installing the system, the system itself is programmed to figure out the minimum system requirements, the best quality signal paths, possible redundant paths of communication so that the system re-routes signals contemporaneously with a specified level of communication failure.

The Navigational Rules

The robotic caddy apparatus of the present invention is provided with stored rules or logic criteria for navigation and/or golf etiquette to control operation of the robotic caddy apparatus. As an example of an etiquette rule, the robotic device can be programmed to follow the golfer between the tee and the green at a selected distance behind the golfer. When the golfer stops, the robotic caddy will stop when it reaches the golfer. As an example of a navigational rule, when the golfer goes into a hazard such as a sandtrap or barranca, the robotic caddy apparatus waits at the edge of the hazard until the golfer returns. When the golfer goes onto the green, the robotic caddy moves to a holding position proximate the next tee.

The navigational rules can include rules which prohibit the robotic device from entering areas such as tee boxes, hazards, greens, sandtraps and the like. The rules can also include a rule for approaching and stopping close to the golfer when summoned by the golfer's transmitter 45, in a manner described below. The navigational rules can also include rules governing movement of the caddy apparatus in areas off the golf course, such as areas around the club house and in the parking lot. The navigational rules also include rules for charting movement around unmapped but dynamically sensed obstacles, such as for example another golf cart, a person, or an animal.

Additional Features

Referring back to FIG. 2, in order to provide additional functions typical of a caddy, robotic golf apparatus 21 of the present invention preferably also includes a graphic display device 76, which can be located conveniently in housing 30, and which can take the form of a liquid crystal display. Display device 76 is coupled through signal communication conductor or line 77 to computer 22 so that display of a particular hole 78 and the distances between the caddy's current position and various features of the golf hole, can be displayed. For example, the distance between the current caddy position and the front, middle and back of the green can be selectively or simultaneously displayed by input to display buttons 79. As the position of the caddy apparatus changes on a hole, the various distances are adjusted automatically by computer 22 and can be displayed as demanded by the player.

Similarly, since caddy apparatus 21 constantly determines its exact position on the stored map, it is possible to store "relative caddy advice" in memory device 96 associated with computer 22. Thus, advice to a golfer which is recalled when the caddy is at a particular location on a hole can be displayed along with distance. It also is possible to have transmitter 45, or another input device, capable of receiving input on information concerning the golfer, such as the golfer's handicap or skill level, and have the relative caddy information vary as a function of the golfer's skill. When to lay-up short of a green, which way a green brakes, etc. can all be stored and displayed. Ultimately, a golfer's history on a particular course on a hole-by-hole basis could be read in and recorded back out onto a golfer's individualized input card for more sophisticated relative caddy tips.

Finally, a manual controller 130 is provided on handle 19 and is coupled to the computer through line 132 so as to enable override of the automatic navigation of the robotic device. Thus, when the golfer decides to pull caddy apparatus 21 as a matter of convenience and/or safety, controller 130 allows the normal navigational rules to be overridden and yet the golfer still obtains power-assisted operation from drive assembly 27. Handle 19 is provided with a strain gauge assembly that includes transducers physically mounted in handle 19 so as to sense pulling, pushing and right and left hand pressure for steering. As an example, the golfer may want to manually guide caddy apparatus 21 in a parking lot environment. The robotic caddy apparatus will "see" automobiles and other golfers in the parking lot, but there is some danger that the drivers of the automobiles will not see or predict the movement of the caddy apparatus. Manual operation of the caddy apparatus under such conditions insures that automobiles will not be driven into the caddy apparatus.

Computer 22 has a program for execution of commands and integration and overlay of the map data, navigational rules, dynamically sensed data, and communication signal input. Such an operations program can take several forms and suitable programming of this type is well known to those skilled in the art once the desired functions and criteria for operation are selected.

In the preferred implementation of the invention, at the start of each day, the central command or control station 51 will activate each caddy apparatus and cause them to move from charging stalls or racks to a parking area proximate the first tee so that golfers can load their golf bags onto the caddy apparatus. Each caddy apparatus carries with it at least one golfer transmitter or beacon 45 so that when the clubs are mounted on caddy frame 26, the golfer can also pick up control transmitter or beacon 45.

Typically, transmitter 45 can operate in the 900 MHz 5 range and have two command switches and which allow the golfer to call or summon the robotic device and release it to another golfer using the same caddy apparatus. Accordingly, in the preferred form, each caddy apparatus is equipped with two golfer beacons or transmitters 45, each of which can call and release the caddy apparatus so that it can service two golfers. The transmitter 45 will have a fixed coded signal 46 identifying the transmitter and will transmit the coded signal four or five times per second for a two millisecond duration. The range of transmitter 45 can be comparatively short.

After loading their clubs and placing transmitters 45 on their belts, in a harness or in a pocket, the golfers can proceed to the first tee and summons the caddy apparatus to the tee. The caddy apparatus then automatically proceeds from the holding or clubhouse parking space proximate the first tee to a parking space at the first tee so the golfers are able to make a club selection. As long as the caddy apparatus senses the location of the golfer in the tee box area on the digital map, the caddy apparatus remains parked proximate the tee box in a parking zone. Thus, the caddy apparatus does not shift or otherwise distract or disrupt the golfers.

Once the golfers have teed off, they can either return the club to the caddy apparatus or carry the club and begin walking down the fairway (hopefully) toward their ball. Once the caddy apparatus sees that the transmitter 45 has left the tee box and started down the fairway, the navigational rules command the caddy apparatus to follow the golfer. Initially, there may be cart paths from the tee box to the fairway within which the caddy apparatus is constrained to move. As the caddy apparatus leaves the tee box on the cart paths, it begins to track the golfer and map the shortest route possible to follow the golfer at a preset, or adjustable, distance behind the golfer.

While out on the course, the caddy apparatus is in what is called "free following" mode, wherein it uses its navigational and behavior rules to selected the appropriate path to take. Some known obstacles on the course can best be handled by programming the caddy apparatus to follow a predetermined course around such obstacles. A good example of this are tee boxes that are isolated, non-accessible islands within accessible areas. For these types of tee boxes, it is best to preprogram a route for the caddy apparatus to circumnavigate the tee box, regardless of where the golfer goes, short of stopping, which the caddy apparatus should always be responsive to. This approach works particularly well because it uses the GPS system to guide the caddy apparatus, rather than the range-and-bearing of-the-golfer guiding method of free following.

While the caddy apparatus is in the various parked positions, transmitter receiver 42 receive signals 67 from satellite transmitter 61 and receives differential signals 53 from control station 51 to determine the position of caddy apparatus, with an acceptable error of margin, on the course map. Thus, the caddy apparatus confirms that it is in the proper parking area. Moreover, the position sensing transducers 72 are always looking for and sensing unmapped objects proximate the parking area and the tee. As the golfers leave the tee and start down the pathway, therefore, the presence of these objects in proximity to the caddy apparatus causes the computer to chart a path around the objects.

Thus, it is an important feature of the present invention that the stored digital map generated in CPU from data in memory 23 is overlaid by a dynamic sensing of localized and unmapped objects, either fixed or moving, which allows the computer to determine the best path for the caddy apparatus to follow the golfer off the tee and down the fairway, in light of the sensed presence of unmapped objects or elements. If, for some unforeseen reason, a bench or other obstruction is positioned entirely across the only permitted path for the caddy apparatus, the caddy apparatus stops, and the golfer can grab the handle and manually navigate the cart around the object until the cart is again in an accessible zone of the map in which automated navigation is permitted. The constant ranging by dynamic sensor assembly 71 preferably is accomplished through ultrasonic transducers, but it will be understood that other ranging apparatus can be employed.

Once on the fairway, the golfer proceeds to his ball and robotic caddy apparatus 21 automatically maps a path to follow the golfer at a distance. When the golfer reaches his ball, the caddy will see that the golfer has stopped and stop at a convenient distance from the golfer. The caddy apparatus can then be programmed to remain parked while the golfer approaches the caddy apparatus, or the caddy apparatus can be summoned to the golfer to enable the golfer to select a club. As part of the club selection, the golfer can input to display apparatus 76 so as to determine the distance to various features on the hole being played and obtain any relative caddy tips that may be available for that location. The caddy apparatus then, under its navigational rules, remains still while the golfer is within a certain radius of the caddy so that the golfer can hit the next shot without caddy motion and can return the club to the caddy apparatus. If the golfer is playing alone, once he proceeds out of the fixed radius, the caddy apparatus senses advancement of the golfer and begins tracking the golfer down the fairway. If playing with another golfer, the first golfer can then release the caddy to the second golfer, who can summon the caddy to the second golfer's position for selection of a club.

If the golfer should hit his ball into a hazard, which is in an inaccessible zone, the caddy apparatus follows the golfer to the edge of the inaccessible zone and waits for the golfer to re turn from the inaccessible area.

As the golfer proceeds to the green, the robotic caddy will follow the golfer up to an area around the fringe of the green. Typically, many golf courses will have sandtraps proximate the green. The caddy apparatus waits at the fringe of the green if it detects that the golfer has advanced into a sandtrap zone or is on the fringe, but not yet on the green. This will allow the golfer to hit a sand wedge or pitching wedge, return to the caddy and replace the sand wedge with a putter. Once the golfer walks onto the green, however, the caddy apparatus departs the fringe and moves to a tee parking area or zone proximate the next tee.

For each shot, the caddy can be released by one golfer to the other so that the clubs of two golfers can be carried by a single caddy. The robotic caddy will continue to monitor the position of the golfer as he leaves the green zone and approaches the tee box zone. The caddy will remain parked, however, until it senses that the golfer has proceeded down the next fairway, indicating that the tee shot has been made. The process of navigation then repeats itself from hole to hole. During the entire process, the caddy apparatus determines its position from transmitters 61 and central command station 51, using spread spectrum, radio-based network communications technology and differential GPS.

If the caddy apparatus loses sight of its predetermined minimum number of satellites for safe and accurate movement, then the caddy apparatus switches into dead reckoning mode. The caddy apparatus determines a safe distance to travel, for example, the distance to the nearest boundary line in the direction the caddy apparatus was heading when it lost sight of it minimum number of satellites. The caddy continues to move in that direction under modified navigational rules, and keeps track of how far it has traveled. If the caddy apparatus approaches close to the boundary line before an additional satellite is again viewable, then the caddy apparatus stops and waits for an additional satellite to come into view or for the golfer to assume manual control of the caddy apparatus. If the caddy apparatus re-establishes communication with another satellite before reaching the boundary line, normal navigational rules again assume control of the caddy apparatus.

The line follower feature, if utilized, comes into play automatically when the caddy apparatus approaches the start of an guide tape or line. The caddy apparatus follows the tape or line, rather than determining its path of movement based on the GPS system position signals. At the end of the tape, normal navigational rules again control.

While the foregoing description of the present invention is that a golf course caddy application, the steerable vehicle concept of the present invention can also be used for other types of self-propelled, guided vehicles, such as lawn mowers, trimmers, sweepers, and other maintenance equipment. For these applications, it may not be necessary to provide a beacon for use in detecting the present location of a golfer, but it would be desirable to provide a sensor on the vehicle to sense signal transmissions from fixed beacons in order to enhance precise movement of the vehicle. Use of such a vehicle as a lawn mower apparatus for a golf course has the tremendous advantage of allowing the apparatus to cut grass during non-play hours, typically at night. Golfers would then be able to play the course during the day without interference from lawn mowing machinery. Also, the cost of such machinery would be greatly reduced because the machinery would not have to be a large as typical golf course machinery. Golf course lawn mowers are large so that the grass can be cut in the shortest amount of time, which minimizes interference with play and reduces labor cost. The present invention allows the downsizing of such machinery because the machinery can operate during non-play hours.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto when read and interpreted according to accepted legal principles such as the doctrine of equivalents and reversal of parts.

What is claimed is:

1. A method of controlling a self-propelled, steerable vehicle through an accessible area with predetermined boundaries defining areas not accessible to the vehicle, the method comprising the steps of (1) moving the object through the accessible area and within the predetermined boundaries, (2) while the vehicle is in the accessible area, using a GPS system having a multiplicity of satellites to determine the approximate location of the vehicle in the accessible area, (3) steering the vehicle based in part on the determined approximate location of the vehicle using the GPS system, and (4) if the number of viewable satellites from which signals can be received in the GPS system falls below a predetermined minimum number, then performing the following steps until the number of viewable satellites increases to the minimum number:

(a) determining a safe distance that the vehicle can travel along a path, which distance is related to the position of the vehicle in relation to the boundaries of the accessible area, at the time the number of viewable satellites falls below the minimum number, and (b) steering the vehicle along the path and at the same time determining the distance the vehicle travels along the path after the time the number of viewable satellites falls below the minimum number using a distance determination device independent of the GPS system, (5) once the number of viewable satellites increases to the minimum number, continuing to steer the vehicle through the accessible area using the GPS system.

2. The method of claim 1 wherein step (4) (b) of steering the vehicle along a path includes, stopping the vehicle should the distance determined in step (4) (b) reach an acceptable safety level proportion of the distance determined in step (4) (a).

3. The method of claim 1 wherein, the vehicle is movable by means of wheels and step (4) (b) of determining the distance the vehicle travels using a distance determination device includes counting the number of revolutions of at least one of the wheels of the vehicle and determining the distance traveled as a function of the number of revolutions.

4. The method of claim 1 wherein, the GPS system has a margin of error based on the number of viewable satellites, and the acceptable safety level proportion has factored into it the margin of error of the GPS system.

5. The method of claim 1 wherein, the vehicle includes, in addition to a receiver, a computer controller for performing steps (3) and (4) (a) and (4) (b).

6. The method of claim 5 wherein, the computer controller includes a data storage device wherein a map of the accessible area, the inaccessible areas and the boundaries therebetween are charted and a set of navigational rules are stored, and the computer controller performs step (3) by triangulating the longitude, latitude and elevation of the vehicle.

7. The method of claim 5 wherein, step (3) is further performed by sending signals from the GPS system to a stationary receiver, the location of which in relation to the map is known, determining the approximate location of the stationary receiver, comparing the known location of the stationary receiver to the determined approximate location of the stationary receiver to create an error figure, and adjusting the determined approximate location of the vehicle by the error figure.

8. The method of claim 1 wherein, the vehicle further includes a compass and step (4) (b) of continuing to move the vehicle includes the step of continuing to move the vehicle in the direction the vehicle was heading when the number of viewable satellites fell below the minimum number, and step (4) (a) of determining a safe distance includes determining the distance to the nearest boundary in the direction that the vehicle is heading.

9. The method of claim 1 wherein, step (1) of moving the vehicle through the accessible area is performed with use of a map charting the accessible area, the areas not accessible and the boundaries therebetween, and further comprising the steps of sensing the presence of uncharted obstacles in the immediate vicinity of the vehicle by means of a sensor carried on the vehicle, mapping a route around the uncharted obstacle, and moving the vehicle around the uncharted obstacl.

10. The method of claim 9 wherein, the step of steering the vehicle includes steering the vehicle along pre-selected routes in certain areas of the accessible area.

11. A method of controlling a self-propelled, steerable vehicle through an accessible area with predetermined boundaries defining areas not accessible to the vehicle, the method comprising the steps of moving the vehicle through the accessible area and within the predetermined boundaries, while the vehicle is in the accessible area, using a GPS system having a multiplicity of satellites to determine the approximate location of the vehicle within the accessible area, steering the vehicle based in part on the determined approximate location of the vehicle using the GPS system, providing a detectable guide mechanism in preselected areas of the accessible area, when the vehicle is within a preselected area, sensing the location of the detectable guide mechanism by a sensor carried on the vehicle, and steering the vehicle along the detectable guide mechanism in response to the sensed location of the guide mechanism, when the vehicle leaves the preselected area, resuming steering of the vehicle by use of the GPS system.

12. The method of claim 11 wherein, the preselected areas are areas where steering of the vehicle by use of the GPS system may be difficult due to one of the margin of error of the GPS system and obstacles to communication with the GPS system.

13. The method of claim 12 wherein, the preselected areas are areas where communication with a predetermined minimum number of satellites is difficult due to one of the margin of error of the GPS system and obstacles to communication with the GPS system.

14. The method of claim 12 wherein, the preselected areas are areas whose boundaries are narrower than the margin of error of the GPS system.

15. The method of claim 11 wherein, the detectable guide mechanism extends along a path, and the vehicle is steered along the path in close proximity with the guide mechanism.

16. A self-propelled, steerable vehicle comprising, a frame movably supported for travel in a designated accessible area, a computer control assembly carried on the frame for controlling movement of the frame in the accessible area, a communications assembly carried on the frame for communicating with a GPS system having a predetermined minimum number of viewable satellites in order to approximate the position of the vehicle within the accessible area, and for communicating with at least one local source in order to guide the vehicle in close proximity to the local source, a distance determination device carried on the frame for determining the distance traveled by the vehicle when communication with GPS system is temporarily interfered with, the computer control assembly including control means for controlling movement of the frame when the number of viewable satellites falls below a predetermined number, including determining a safe distance that the frame can travel along a path, which distance is related to the position of the frame in relation to the accessible area, at the time the number of viewable satellites falls below the minimum number, and further including steering the frame along the path and at the same time determining the distance the vehicle travels along the path after the time the number of viewable satellites falls below the minimum number using the distance determination device independent of the GPS system.

17. The apparatus of claim 16 wherein, the interference is the result of the viewable number of satellites falling below the predetermined minimum number.

18. The apparatus of claim 16 wherein, the distance determination device operates independently of the GPS system.

19. The apparatus of claim 18 wherein, the movable frame includes at least one wheel, and the distance determination device comprises a sensor for determining the number of revolutions of the wheel of the movable frame.

20. The apparatus of claim 18 wherein, the movable frame includes at least one wheel, and the distance determination device comprises means for determining the number of revolutions of the wheel of the movable frame.

21. The apparatus of claim 16 and further comprising, a sensor for detecting a guide mechanism in the accessible area, and wherein the computer control assembly is adapted to move the vehicle along the guide mechanism when the vehicle moves into close proximity of the guide mechanism.

* * * * *